(12) United States Patent
Mäeckle et al.

(10) Patent No.: US 7,210,201 B2
(45) Date of Patent: May 1, 2007

(54) CLAMP COUPLING FOR PIPES (75) Inventors: Raimund Mäeckle, Esslingen (DE); Karl-Heinz Junghans, Filderstadt (DE)

(73) Assignee: Putzmeister Aktiengesellschaft, Aichtal (DE)

( * ) Notice: Subject to any disclaimer, the term of this patent is extended or adjusted under 35 U.S.C. 154(b) by 0 days.

(21) Appl. No.: 10/432,272

(22) PCT Filed: Nov. 14, 2001

(86) PCT No.: PCT/EP01/13154

§ 371 (c)(1),
(2), (4) Date: May 19, 2003

(87) PCT Pub. No.: WO02/40908

PCT Pub. Date: May 23, 2002

(65) Prior Publication Data

US 2004/0032126 A1   Feb. 19, 2004

(30) Foreign Application Priority Data

Nov. 17, 2000   (DE) .............................. 100 57 304

(51) Int. Cl.
*F16L 23/06* (2006.01)
*A44B 21/00* (2006.01)

(52) U.S. Cl. ........................... 24/270; 24/273; 285/365

(58) Field of Classification Search ................ 24/270, 24/273; 285/175, 256, 114, 234, 365; 292/DIG. 30, 292/29; 16/DIG. 32
See application file for complete search history.

(56) References Cited

U.S. PATENT DOCUMENTS 1,072,253 A * 9/1913 Peck ........................... 138/99
1,638,269 A * 8/1927 Mullinack .................... 24/270
1,646,463 A * 10/1927 Stokesberry ................. 24/273

(Continued)

FOREIGN PATENT DOCUMENTS

DE          931 727 C        8/1955

(Continued)

*Primary Examiner*—Jack W. Lavinder
(74) *Attorney, Agent, or Firm*—Akerman & Senterfitt; Stephan A. Pendorf (57) ABSTRACT

The invention concerns a clamp coupling for coupling pairs of pipes. Such clamp couplings are used, for example, for coupling concrete conduits from concrete pumps. This clamp coupling (10) comprises two clamp shells (16, 18) which, in the coupling state, define a circular opening (14) for the passage-through of the pipes. The coupling shells can be pivoted relative to each other via a pivot linkage (20) at their one end, and have a locking mechanism (26) provided at their other end. In order to be able to fasten the clamp coupling (10) even in confined spaces, the locking mechanism (26) comprises a locking hook (30) which, in the closed state, positively grasps a latch pin (24) provided on the other coupling clamp (16), and pulls the clamp shells (16, 18) towards each other at their point of separation (28) opposite the linkage (20). During the opening process, the locking hook (30) can be lifted from the latch pin (24) and pivoted out of its engaged position about a pivoting axis (32) which is perpendicular to the linkage axis (22). The locking mechanism (26) also comprises a clamping lever (36) which can be pivoted relative to the coupling clamp about a lever axis (34) which is perpendicular to the linkage axis. The clamping lever is also operatively associated with the locking hook (30).

4 Claims, 7 Drawing Sheets

U.S. PATENT DOCUMENTS

| | | | | |
|---|---|---|---|---|
| 1,695,961 A | * | 12/1928 | Howse | 5/298 |
| 1,960,922 A | * | 5/1934 | Richard | 292/101 |
| 2,543,589 A | | 2/1951 | Newcomb | 284/18 |
| 3,042,430 A | * | 7/1962 | Granville | 24/270 |
| 3,201,156 A | * | 8/1965 | Coats | 24/273 |
| 3,379,460 A | | 4/1968 | Allyn | 285/312 |
| 3,828,403 A | * | 8/1974 | Perrin et al. | 24/270 |
| 4,123,095 A | * | 10/1978 | Stehlin | 24/270 |
| 4,272,871 A | * | 6/1981 | Weinhold | 24/270 |
| 4,573,717 A | * | 3/1986 | Peacock | 285/365 |

FOREIGN PATENT DOCUMENTS

| | | |
|---|---|---|
| DE | 11 86 284 B | 1/1965 |
| DE | 72 29 511 U | 11/1972 |
| DE | 25 50 825 A | 5/1977 |
| GB | 2 066 405 A | 7/1981 |

* cited by examiner

CLAMP COUPLING FOR PIPES

CROSS REFERENCE TO RELATED APPLICATION

This application is a national stage of PCT/EP01/13154 filed Nov. 14, 2001 and based upon DE 100 57 304.5 filed Nov. 17, 2000 under the International Convention.

BACKGROUND OF THE INVENTION

1. Field of the Invention

The invention concerns a clamp coupling for the pair-wise coupling of pipes, the pipes having substantially radially projecting coupling flanges at the ends facing each other, the clamp coupling comprising two clamp shells which, in the coupled state, define a circular opening for the passage-through of the pipes, said shells pivotable relative to each other about a linkage axis parallel to the opening via an external linkage, wherein the first clamp shell is provided on the end opposite the linkage with a radially projecting latch pin and the second clamp shell is provided on the end opposite the linkage with a locking mechanism which cooperates with said latch pin.

2. Description of the Related Art

Clamp couplings of this type have been employed as pipe couplings primarily in concrete conveyance lines. Due to the high conveyance pressures occurring there, a stable and reliable connection and a good seal in the coupling area is essential. Clamp couplings are known (DE-U-72 29 511, DE-C-1 186 284), in which the locking mechanism includes a clamping lever engagable with a latch pin, which is limitedly pivotable about an axis axially parallel to the circular opening from an open position to a closed position lying against the exterior surface of the latch pin carrying clamp shell. Such clamp couplings can often not be employed in difficult to access locations in narrow spaces due to the need to pivot the clamp lever about greater than 90° axially parallel to the circular opening.

SUMMARY OF THE INVENTION

Beginning therewith, it is the task of the invention to develop a clamp coupling of the above described type, which can be employed also in difficult to access locations in narrow spaces.

The solution of this task is proposed in accordance with the combination of characteristics set forth in patent claim 1. Advantageous embodiments and further developments of the invention can be seen from the dependent claims.

The inventive solution is based upon the idea, that the locking mechanism of the clamp coupling would exhibit a small space requirement if the pivotable parts thereof were pivotable not about an axis running parallel to the pipe axis, but rather perpendicular thereto. In order to achieve this, it is proposed in accordance with the invention that the locking mechanism comprises a locking hook which in the closed state positively grasps a latch pin provided on the other coupling clamp and pulls the clamp shells towards each other at their point of separation opposite the linkage, which hook can, during the opening process, be lifted from the latch pin and pivoted out of its engaged position about a pivoting axis which is perpendicular to the linkage axis and thus perpendicular to the pipe axis. According to a preferred embodiment of the invention the locking mechanism additionally includes a clamp lever pivotable about a lever axis perpendicular to the linkage axis and operatively associated with the locking hook, which when the locking hook is in the clamped position lies against the latch pin and which when the locking hook is in the released position is lifted from the latch pin with freeing up of its pivot path.

A further preferred embodiment of the invention envisions that the clamp lever is an eccentric lever, which is pivotable about a lever axis provided on the second clamp shell perpendicular to the linage axis and which includes an eccentric shaft eccentric to the lever axis engaging in a mounting bore of the locking hook concentric to the pivot axis. For this, the clamp lever preferably exhibits a mounting bore eccentric to the outer surface of the eccentric shaft, with which it is mounted on a mounting pin provided on the second clamp shell and defining the lever axis.

The latch pin, against which the locking hook lies in the closed position, is preferably a cylindrical or partial cylindrical dowel.

In order to make possible a reliable securing of the coupling in the closed position it is proposed in accordance with a further advantageous embodiment of the invention, that the pivotable parts and the parts of the locking mechanism rigidly connected with the second coupling shell are provided with locking boreholes, which align with each other for receiving a lock pin when in the closed positioned of the locking mechanism. The lock in can therein be provided with a spring shank as supplemental arresting means.

It is further proposed in accordance with the invention, that the pivotable parts of the locking mechanism are provided fixed against sliding on the associated mounting or locking pin.

BRIEF DESCRIPTION OF THE DRAWINGS

In the following the invention will be described in greater detail on the basis of a illustrative embodiment shown in schematic manner in the figures. There is shown FIG. 1*a* a perspective representative of a clamp coupling for pipes in closed condition.

DETAILED DESCRIPTION OF THE INVENTION

The clamp coupling shown in the figures is designed for connecting pipe segments. It is used for example for connecting two not shown pipe segments of a pressure conveyance conduit for thick matter and is employed there above all in difficult to access locations due to the limited space available. The clamp coupling 10 includes two clamp shells 16, 18 arranged essentially mirror symmetrically to a separating plane 12, in which in the coupling position shown in FIG. 1*c* they form a round opening 14 for defining the passage through of a pipe. The coupling shells 16, 18 are pivotable relative to each other about an axis 22 parallel to the circular opening 14 via an externally located linkage 20 lying in the separating plane 12 at their one end. On its end opposite to the linkage 20 the first clamp shell 16 exhibits a radially outwardly projecting latch pin 24 in the form of a cylindrical dowel and the second clamp shell 18 exhibits a locking mechanism 26 which cooperates with the latch pin 24. The locking mechanism 26 includes a locking hook 30 which form fittingly engages the latch pin 24 in the closed position thereby pulling the coupling shells together at their separating locations 28 lying opposite to the linkage 20, which hook can be lifted from the latch pin 24 in the opening process and pivoted about a pivot axis 32 perpendicular to the linkage axis 22 out of the engagement area. Further, the locking mechanism includes a clamping lever 36 cooperating with the locking hook 30 and pivotable about a lever axis 34 perpendicular to the linkage axis 22, such that in the closed or clamped position the locking hook 30 lies against the latch pin 24 and when in the released position thereof the locking hook is lifted from the latch pin 24 with freeing of its pivot path. The clamp lever 36 is therein in the form of an eccentric lever, which is pivotable about a lever axis 34 perpendicular to the linkage axis 22 provided on the second coupling shell 18 and which includes an eccentric shaft 40 eccentric to the lever axis and engaging in a mounting bore 38 coaxial to the pivot axis 32. Besides this the clamp lever 36 exhibits a mounting bore 42 eccentric to the outer surface 41 of the eccentric shaft 40, via which it is mounted on a lever axis 34 forming mounting pin 44 which projects beyond the second clamp shell 18. On the face or opposite side the locking mechanism is secured by a mounting cap 45 seatable upon the mounting pin 44.

In order to be able to secure the clamp coupling 10 in the closed position against an inadvertent opening, the pivotable parts 30, 36 and the parts 44 of the locking mechanism 26 rigidly connected with the second coupling shell 18 are provided with locking boreholes 46, which are aligned with each other for receiving a locking pin 48 in the closed position of the locking mechanism 26. As a supplemental detent or arresting element the lock pin 48 includes a spring shank 50, with which is urged biased against the locking mechanism against the spring tension (see FIGS. 1*a* through *d*).

Figure 1A:
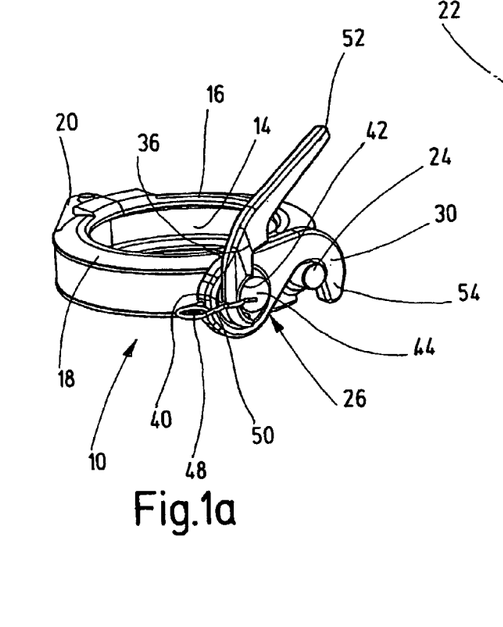
Figure 1B:
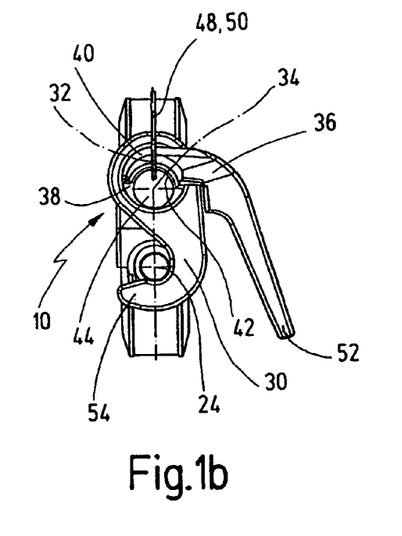
FIGS. 1*b, c* and *d* three side views of the clamp coupling according to FIG. 1*a;*
Figure 1C:
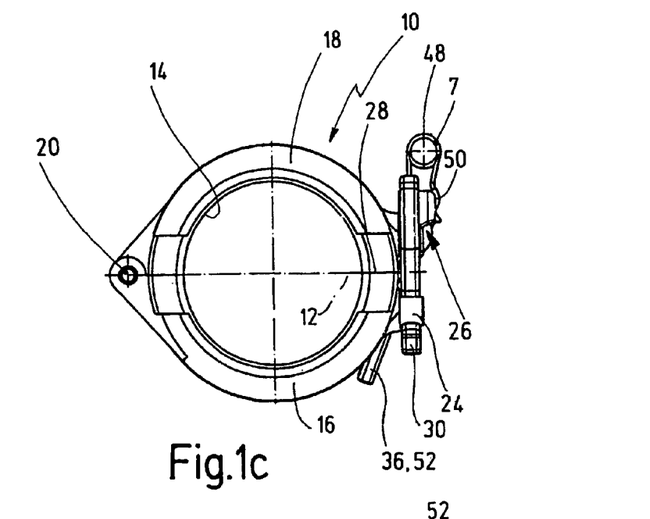
Figure 1D:
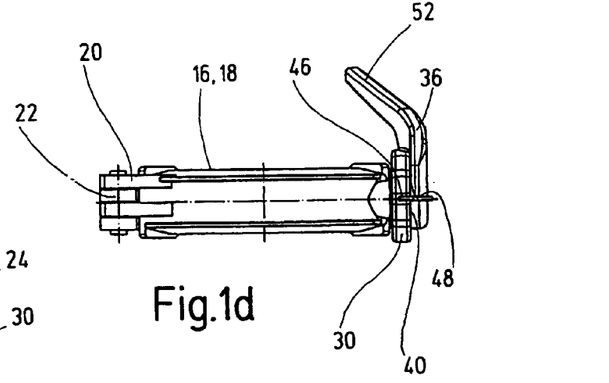
Figure 2A:
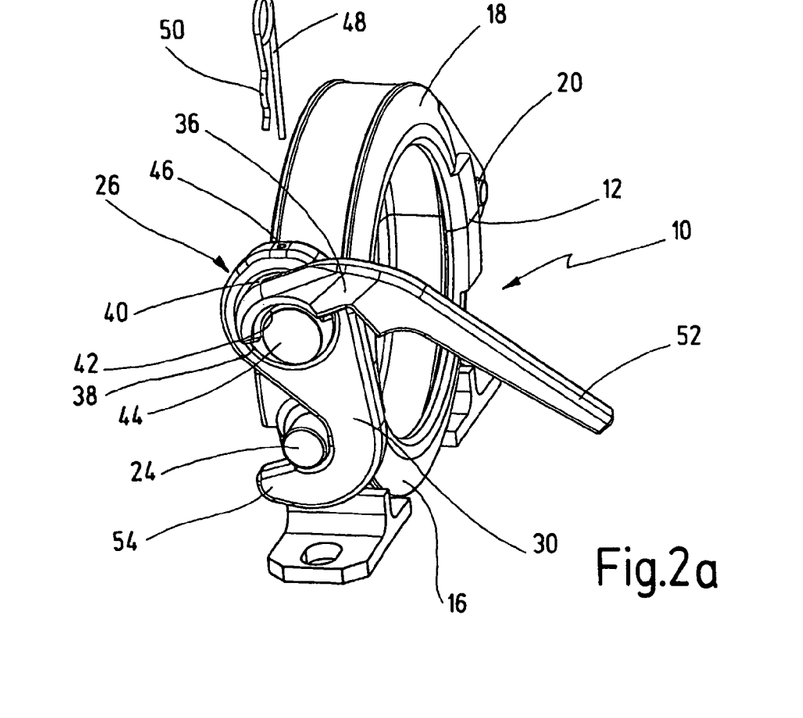
FIGS. 2*a* through *d* the clamp coupling according to FIG. 1*a* in various positions of the locking mechanism during the opening and locking process respectively in perspective representation.
Figure 2B:
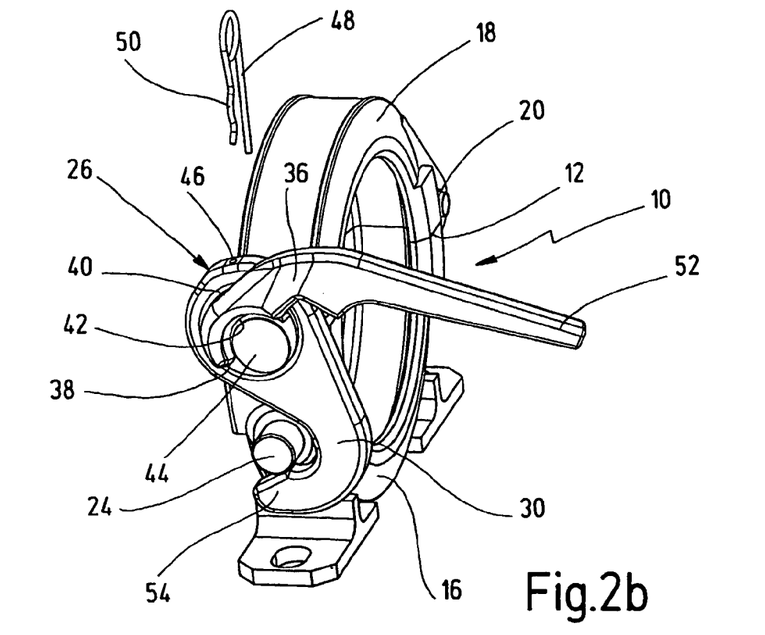
Figure 2C:
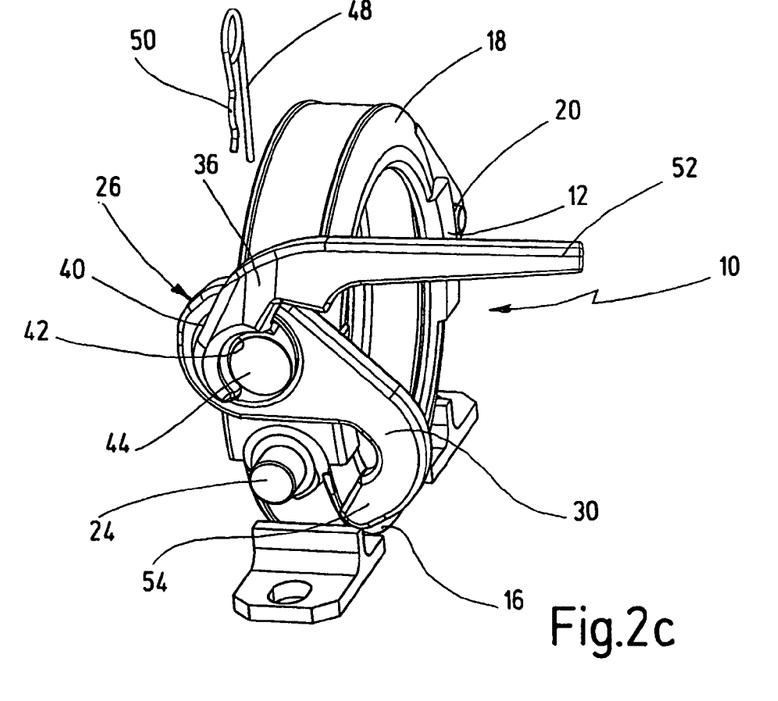
Figure 2D:
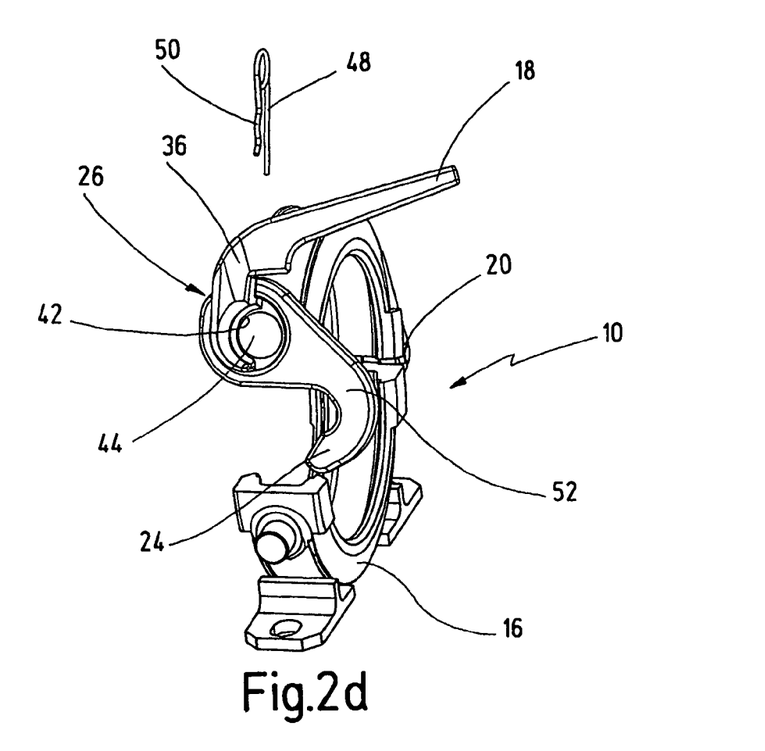
Figure 3A:
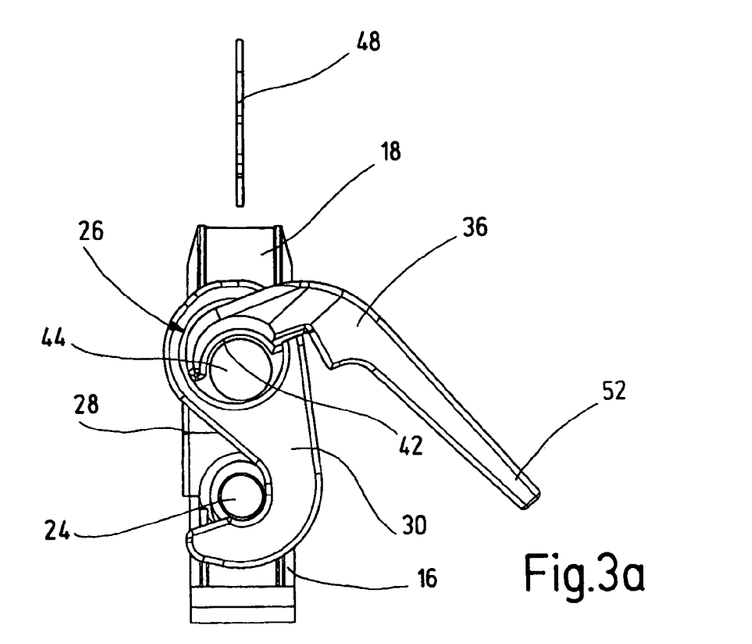
FIGS. 3*a* through *d* a top view upon a locking mechanism of the clamp coupling in the open position according to FIGS. 2*a* through *f;*
Figure 3B:
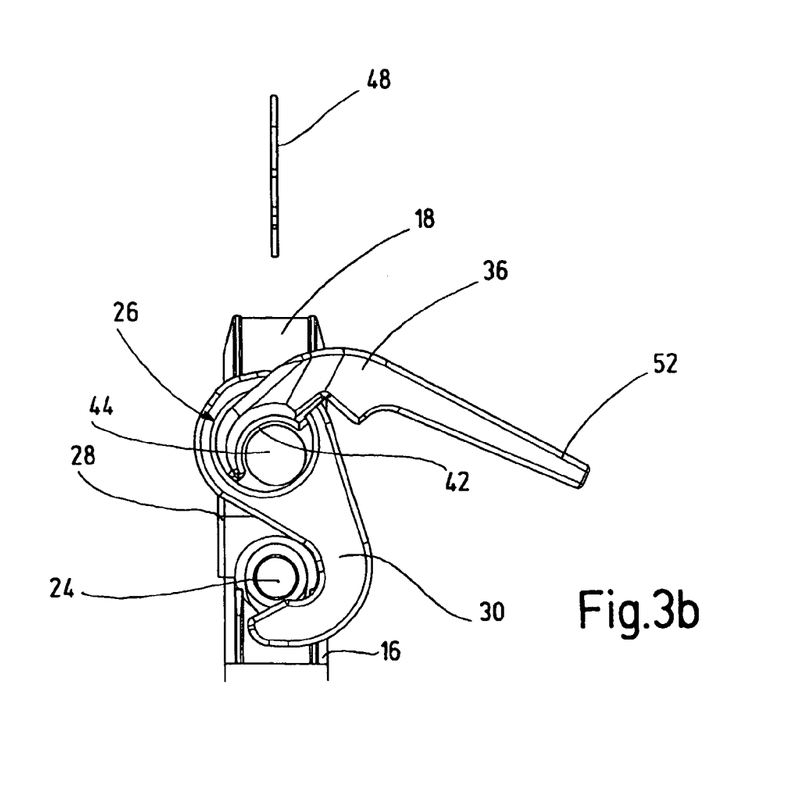
Figure 3C:
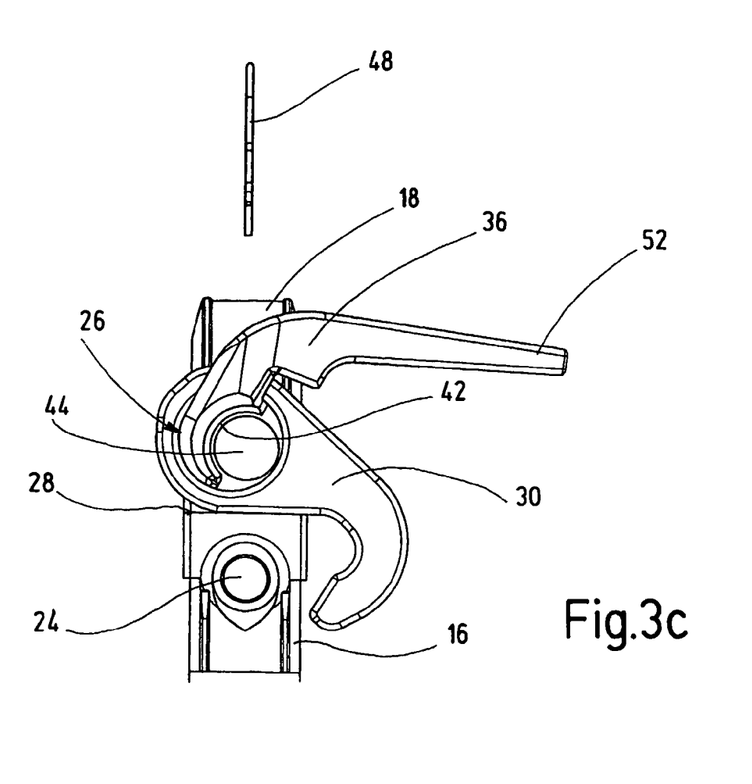
Figure 3D:
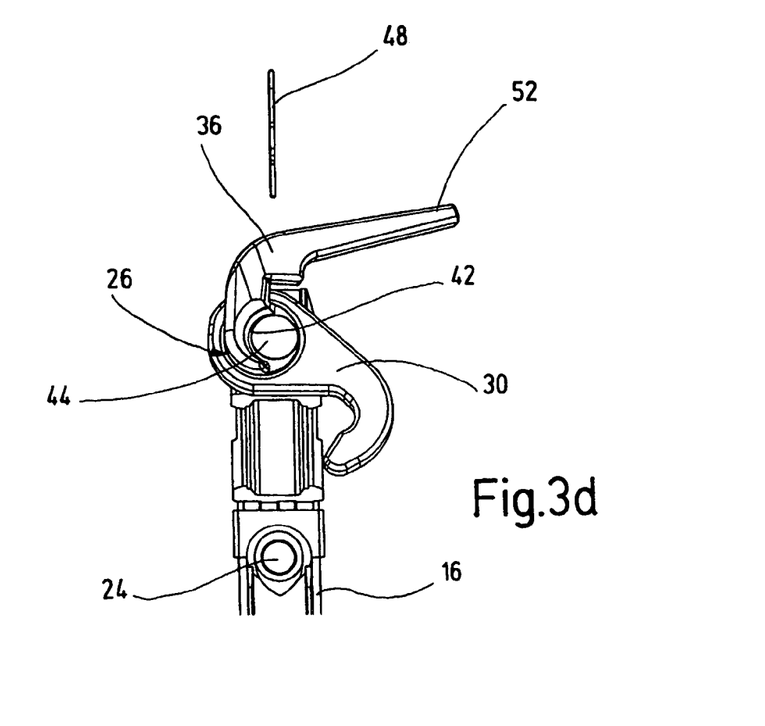
Figure 4:
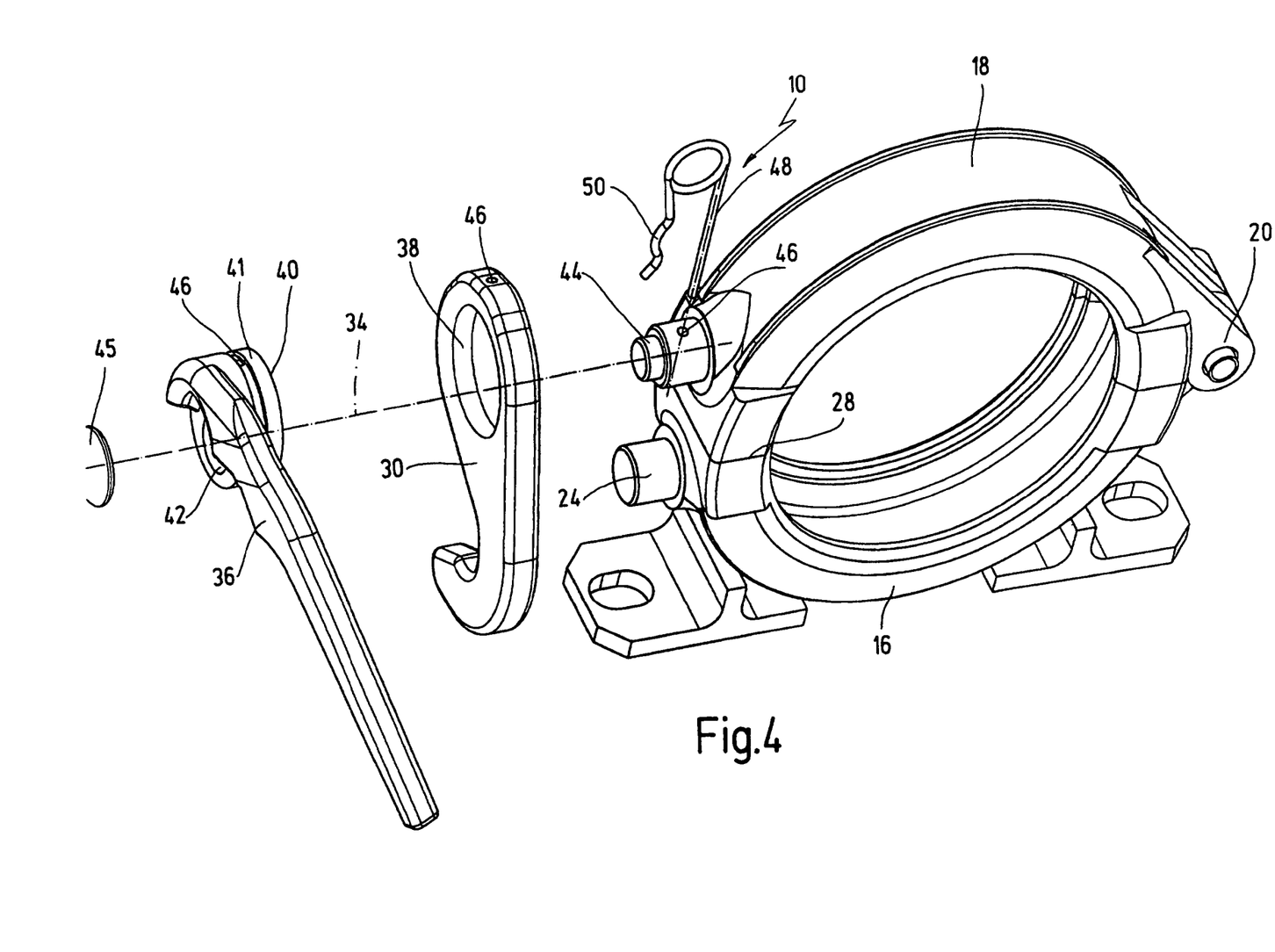
FIG. 4 a perspective exploded representation of the clamp coupling.
Figure 5A:
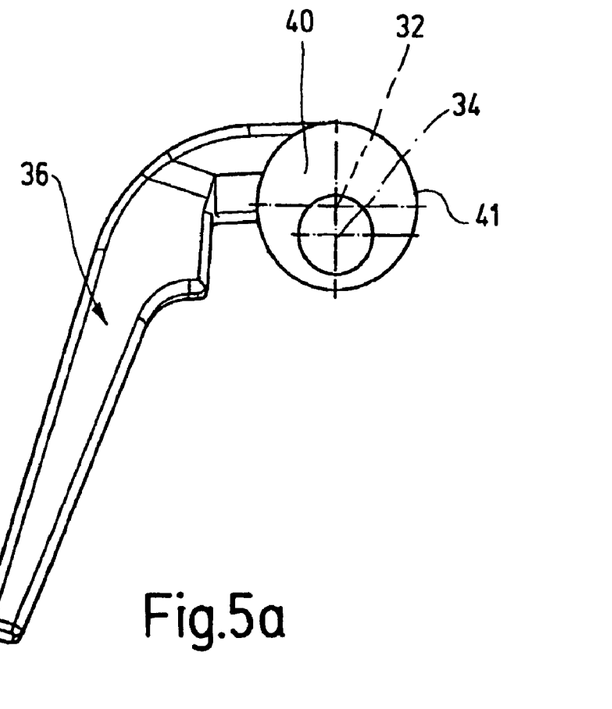
FIGS. 5*a* through *c* three different views of the clamp lever.
Figure 5B:
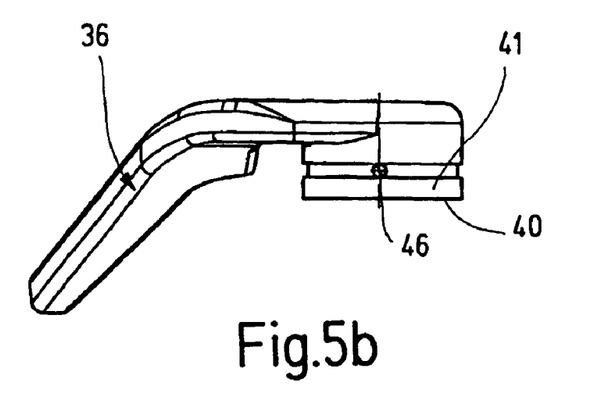
Figure 5C:
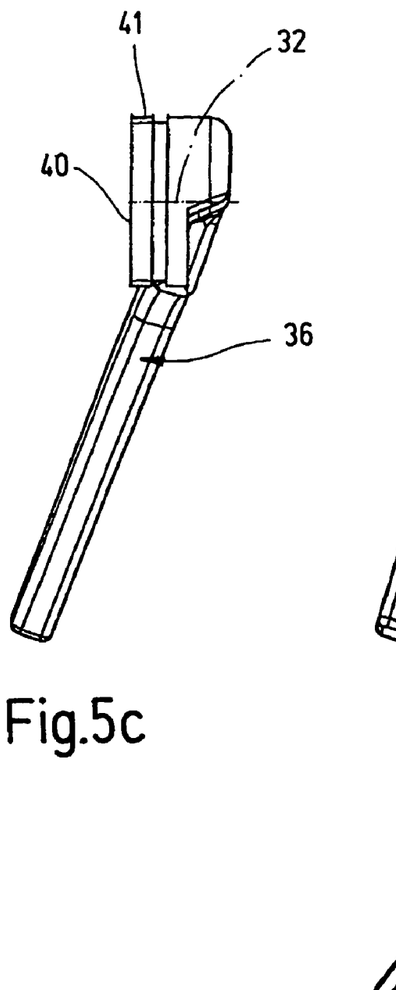

For opening the clamp coupling first the lock pin 48 is pulled out of the locking boreholes 46 (FIGS. a through d, 3*a* through *d*). Then the clamp lever 36 is grabbed by hand on its lever arm 52 and raised or lifted out of its locking position. Thereby it reaches the position shown in FIGS. 2*a* through *d* as well as 3*a* through *d*. Due to the eccentric movement of the eccentric disk 60 in the mounting bore 38 first the locking hook 30 is lowered in its entirety, until the hook part 54 has sufficiently removed itself from the latch pin 24 (FIGS. 2*b*, 3*b*). Upon further lifting of the lever arm 52 the locking hook 32 reaches or extends with its hook part 54 out of the effective or engaging area of the latch pin 24 (FIGS. 2*c*, 3*c*), so that the coupling shells 16, 18 can be lifted off of each other at their separating point 28 by pivoting about the linkage axis 22 (FIGS. 2*d*, 3*d*). In this condition the pipes to be connected to each other can be introduced in the clamp coupling with their each other facing end flanges. The locking process of the clamp coupling then proceeds in the reverse sequence (FIGS. 2*d* through 2*a*, FIG. 1*a*).

In summary the following can be concluded: The invention concerns a clamp coupling for coupling pairs of pipes. Such clamp couplings are used, for example, for coupling concrete conduits from concrete pumps. This clamp coupling (10) comprises two clamp shells (16, 18) which, in the coupling state, define a circular opening (14) through which the pipes pass. The coupling shells can be pivoted relative to each other via a pivot linkage (20) at their one end, and have a locking mechanism (26) provided at their other end. In order to be able to fasten the clamp coupling (10) even in confined spaces, the locking mechanism (26) comprises a locking hook (30) which, in the closed state, positively grasps a latch pin (24) provided on the other coupling clamp (16), and pulls the clamp shells (16, 18) towards each other at their point of separation (28) opposite the linkage (20). During the opening process, the locking hook (30) can be lifted from the latch pin (24) and pivoted out of its engaged position about a pivoting axis (32) which is perpendicular to the linkage axis (22). The locking mechanism (26) also comprises a clamping lever (36) which can be pivoted relative to the coupling clamp about a lever axis (34) which is perpendicular to the linkage axis. The clamping lever is also operatively associated with the locking hook (30).

The invention claimed is:

1. A clamp coupling for the pair-wise coupling of pipes, the pipes having substantially radially projecting coupling flanges at the ends facing each other, the clamp coupling comprising:

two clamp shells (16, 18) which, in the coupled state, define a circular opening (14) for the passage-through of the pipes, said shells pivotable relative to each other about a linkage axis (22) parallel to the opening (14) via an external linkage (20), wherein the first clamp shell (16) is provided on the end opposite the linkage (20) with a radially projecting latch pin (24) and the second clamp shell (18) is provided on the end opposite the linkage (20) with a locking mechanism (26) which cooperates with said latch pin (24), wherein the locking mechanism (26) comprises a locking hook (30) which, in the closed state, positively engages and pulls the clamp shells (16, 18) towards each other at their point of separation (28) opposite the linkage (20), which locking hook (30) can be lifted from the latch pin (24) during the opening process and be pivoted out of its engaged position about a lever pivoting axis (32), wherein the locking mechanism (26) comprises a clamping lever (36) which can be pivoted relative to the coupling clamp about a lever axis (34) perpendicular to the linkage axis (22), wherein in the clamped position the locking hook 30 lies against the latch pin (24) and which in the released position of the locking hook (30) with freeing of it's pivot pat is lifted from the latch pin (24), and wherein the clamping lever (36) is an eccentric lever, pivotable about said lever axis (34) associated wit the second clamp shell (18) and perpendicular to the linkage axis (22), and which includes an eccentric shalt (40) eccentric to the lever axis (34) and engaging in a mounting bore (38) concentric with the lever pivot axis (32).

2. A clamp coupling according to claim 1, wherein the clamp lever (36) includes a mounting bore (42) eccentric to the outer surface (41) of the eccentric shaft (40), via which it is mounted via a mounting pin (44) defining the lever axis (34) and projecting beyond the second coupling shell (18).

3. A clamp coupling for the pair-wise coupling of pipes, the pipes having substantially radially projecting coupling flanges at the ends facing each other, the clamp coupling comprising:

two clamp shells (16, 18) which, in the coupled state, define a circular opening (14) for the passage-through of the pipes, said shells pivotable relative to each other about a linkage axis (22) parallel to the opening (14) via an external linkage (20), wherein the first clamp shell (16) is provided on the end opposite the linkage (20) with a radially projecting latch pin (24) and the second clamp shell (18) is provided on the end opposite the linkage (20) with a locking mechanism (26) which cooperates with said latch pin (24), wherein the longitudinal axis of the pin extending radially from an outer surface of the clamp shell, wherein the locking mechanism (26) comprises a locking hook (30) which, in the closed state, positively engages and pulls the clamp shells (16, 18) towards each other at their point of separation (28) opposite the linkage (20), which locking hook (30) can be lifted from the latch pin (24) during the opening process and be pivoted out of its engaged position about a pivoting axis (32;

further comprising pivotable part (36) and part (44), wherein the pivotable part (36) and the part (44) are connected with the second coupling shell (18), wherein the pivotable part (36) and locking hook (30) are provided with latch/lock/interlock/bolt bores (46), which in a locking position of the locking mechanism (26) both boreholes are aligned with each other for receiving an insertion lockpin (48).

4. A clamp coupling according to claim 3 wherein the lockpin (48) includes as supplemental locking mechanism, a spring shank (50).

* * * * *